United States Patent [19]

McCormack

[11] Patent Number: 4,947,381

[45] Date of Patent: Aug. 7, 1990

[54] DETECTION OF SUBTERRANEAN ANISOTROPY

[75] Inventor: Michael D. McCormack, Plano, Tex.

[73] Assignee: Atlantic Richfield Company, Los Angeles, Calif.

[21] Appl. No.: 308,039

[22] Filed: Feb. 8, 1989

Related U.S. Application Data

[63] Continuation-in-part of Ser. No. 135,390, Dec. 21, 1987, abandoned.

[51] Int. Cl.$^5$ ............................ G01V 1/40; G01V 1/53
[52] U.S. Cl. ................................. 367/75; 367/31; 367/47; 364/421; 364/422
[58] Field of Search ............... 367/31, 47; 364/421, 364/422; 73/815, 841

[56] References Cited

U.S. PATENT DOCUMENTS

| | | |
|---|---|---|
| 3,949,352 | 4/1976 | Vogel . |
| 4,059,820 | 11/1975 | Turpening . |
| 4,575,828 | 7/1984 | Williams . |
| 4,631,964 | 12/1986 | Sprunt et al. . |
| 4,641,520 | 8/1984 | Mao . |
| 4,712,641 | 9/1984 | Chelminski . |
| 4,713,968 | 5/1986 | Yale . |
| 4,719,607 | 1/1988 | Airhart ................................. 367/75 |
| 4,755,972 | 7/1988 | Hanson et al. ........................ 367/75 |
| 4,789,969 | 12/1988 | Naville ................................. 367/75 |
| 4,794,572 | 12/1988 | Sondergeld et al. ................. 367/31 |
| 4,803,666 | 2/1989 | Alford .................................. 367/36 |
| 4,817,061 | 3/1989 | Alford et al. ......................... 367/75 |
| 4,832,148 | 5/1989 | Becker et al. ........................ 367/25 |

FOREIGN PATENT DOCUMENTS 0169076  1/1986  European Pat. Off. ............. 367/75

OTHER PUBLICATIONS

Levin, F. K.; "Seismic Velocities . . . Isotropic Media", 1/80, Geophysics, vol. 45, #1, pp. 3–17.
Justice et al., "Anisotropy in . . . New Mexico", 12/6/84, 54th Annual Soc. Explor. Geophysic. Int. Mtg; pp. 154–164.

*Primary Examiner*—Nelson Moskowitz
*Attorney, Agent, or Firm*—James C. Fails; Arthur F. Zobal; Geoffrey A. Mantooth

[57] ABSTRACT

A method of generating and processing seismic data from subterranean formations characterized by dividing recorded SH- and SV- velocity profiles to delineate those subterranean formations having azimuthal anisotropy, as indicated by a ratio $V_{SH}/V_{SV}$ different from 1; for example, of less than 1, to indicate those suberranean formations which have the potential for holding a desired fluid, such as oil or other hydrocarbon.

2 Claims, 2 Drawing Sheets

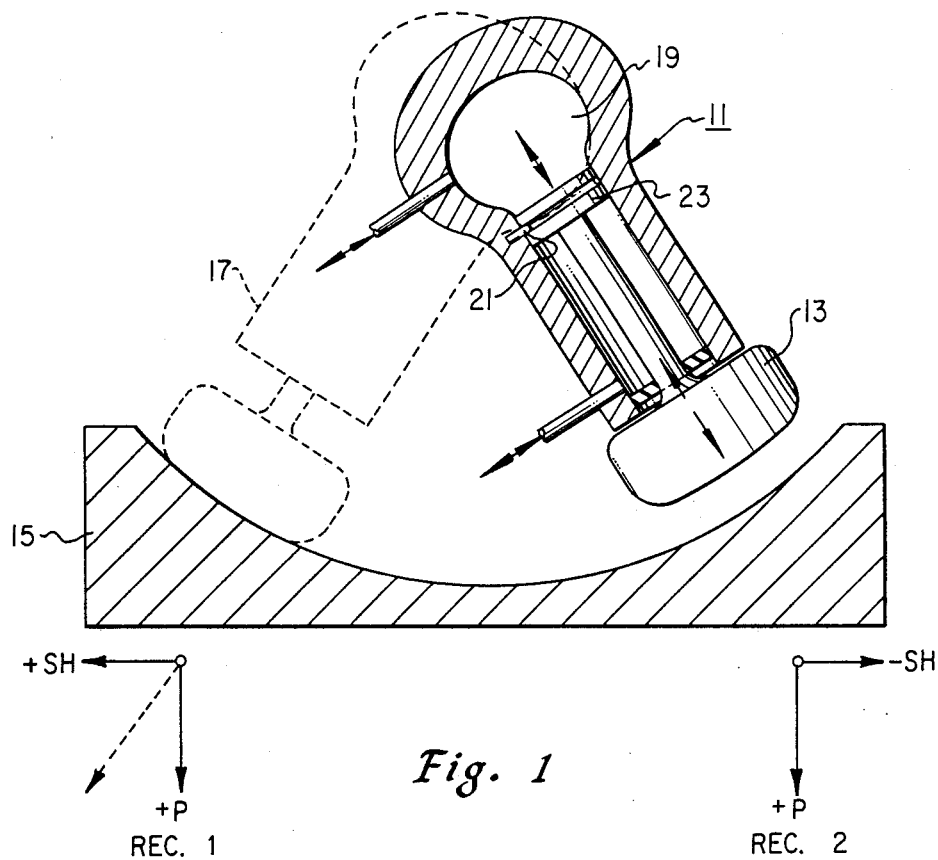
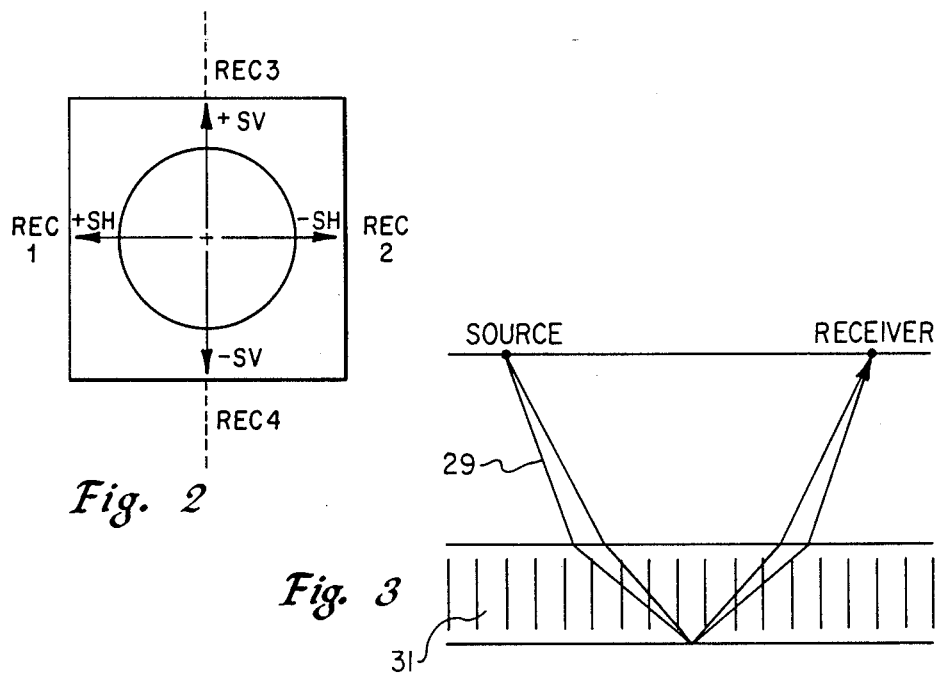
Fig. 1
Fig. 2
Fig. 3

DETECTION OF SUBTERRANEAN ANISOTROPY

CROSS REFERENCE TO RELATED APPLICATIONS

This application is a continuation-in-part application of U.S. Ser. No. 07/135,390, filed Dec. 21, 1987, same inventor, same title and same assignee, now abandoned.

FIELD OF THE INVENTION

This invention relates to a method of generating and processing seismic data. More particularly it relates to a method of generating and processing seismic data so as to delineate azimuthal anisotropy in subterranean formations.

BACKGROUND OF THE INVENTION

The art of seismic exploration has seen the development of a wide variety of approaches to generating energy, recording and processing the received signal from the sources, as reflected from subterranean strata and the like. For example, Hudson, J. A. in his article "Waves, Speeds and Attenuation of Elastic Waves in Material Containing Cracks," GEOPHY. J. R. ASTR. SOC., 64, page 133–150, 1981 and Crampin, S. in his article "An Introduction to Wave Propagation in Anisotropic Media, " GEOPHY. J. R. ASTR. SOC., 76, page 17–28, (1984) have developed theoretical expressions for elastic wave propagation through azimuthally anisotropic solids. An azimuthally anisotropic solid is one in which the elastic properties vary with azimuth as measured at the surface. An example of such a solid would be one which contains a set of parallel vertical fractures. Their studies predict that propagation velocity of shear wave energy through an azimuthally anisotropic solid depends upon the orientation of the local particle motion direction of the shear wave with respect to the principal symmetry axis of the anisotropy. Simpler forms of anisotropy exist when a vertical symmetry axis is present; that is, the so-called "transverse isotropy", commonly present in shales. By recording and analyzing two components of the shear wave energy, referred to as SH wave and SV wave, it is possible to estimate the degree of anisotropy at a given point in the earth. The terms "SH-wave" and "SV-wave" energy are defined in relation to the orientation of the seismic survey. "SV-wave" refers to any shear wave energy that propagates with its particle motion in the vertical plane containing the shear wave energy source and receiver. "SH-wave" refers to shear waves that propagate with particle motion perpendicular to this aforementioned vertical plane. There are several methods that have been described previously for estimating the degree of anisotropy using SH- and SV-wave energies. One such compares the SH- and SV-wave interval velocities derived from their approximate stacking velocity functions by the Dix approximation. Unfortunately, this approach permits only a very coarsely sampled and unreliable estimate of the subsurface shear wave velocity anisotropy.

In my earlier filed and hereinbefore referenced patent application Ser. No. 135,390, there was cited the following U.S. patents.

| | |
|---|---|
| 3,949,352 | Vogel |
| 4,059,820 | Turpening |
| 4,575,828 | Williams |
| 4,631,964 | Sprunt et al |
| 4,641,520 | Mao |
| 4,712,641 | Chelminski |
| 4,713,968 | Yale |
| 4,719,607 | Airhart |

Also cited was European patent No. 0,169,076, Alford, et al and the following literature articles.

Levin, F. K.; "Seismic Velocities in Transverse Isotropic Media", 1/80, Geophysics, Vol. 45, 1, PP3–17, Abstract provided.

Justice et al; "Anisotropy in . . . New Mexico", Dec. 6, 1984, 54th Annu. for Explor. Geophys. Int Mtg. PP154–164, Abstract only provided.

Of these, Alford (European patent No. 169,076), claims to detect azimuthal anisotropy on the basis of difference in reflections time of SH- and SV-wave energies from the subsurface boundaries above and below the anisotropic zones.

In that reference, the time difference is measured and used to infer the presence of vertical fractures in the anisotropic zone. It is important to note that this invention determines one average anisotropy for the gross interval bounded by the upper and lower reflecting interfaces using travel time information only. This reference does not disclose making the calculation for every sample taken at regularly spaced time intervals of from 1 to 4 milliseconds, for example 2 milliseconds. Moreover, if there are subintervals of varying anisotropy within the gross interval, they would not be detectable by the Alford invention. Further, the Alford invention requires clearly defined and separated reflection signals from the upper and lower boundary interfaces in order to measure the time difference. This means that the gross interval can be no less than a few hundred feet in thickness and more probably must be several hundred to thousands of feet in thickness. Thus, the Alford invention can provide only crude estimates of subsurface anisotropy, in contrast to this invention.

There are other patents and publications on seismic prospecting, of course, but these are not as close as the cited references.

It would therefore be desirable to have a seismic processing and analysis technique that could provide estimates of the degree of anisotropy of a subsurface formation on the order of 10 to 100 feet in thickness using SH- and SV-wave energies.

From the foregoing it can be seen that the prior art has not provided high resolution determination of anisotropy by estimating the SH- to SV-wave velocity ration from digital multi-components seismic data on a continuous sample-by-sample basis.

BRIEF DESCRIPTION OF THE DRAWINGS

FIG. 1 is a schematic view of an inclined impactor source, given the trademark ARIS, for imparting energy as a source and the relative vectoral representation of the energy imparted from the source for one shear wave orientation that will provide an SH-wave and P-wave energies.

FIG. 2 is a schematic map view of the baseplate of an inclined impactor source for imparting energy as a source, and the relative vectoral representation of the energy imparted from the source for SH-wave and SV-wave energies. The dashed line represents the orientation of the impactor source relative to the seismic profile direction.

FIG. 3 is a side elevational view, schematic, to illustrate by ray path representation, transmission of the energy through the subterranean formations, including an anisotropic strata, or formation.

SUMMARY OF THE INVENTION

Figure 4:
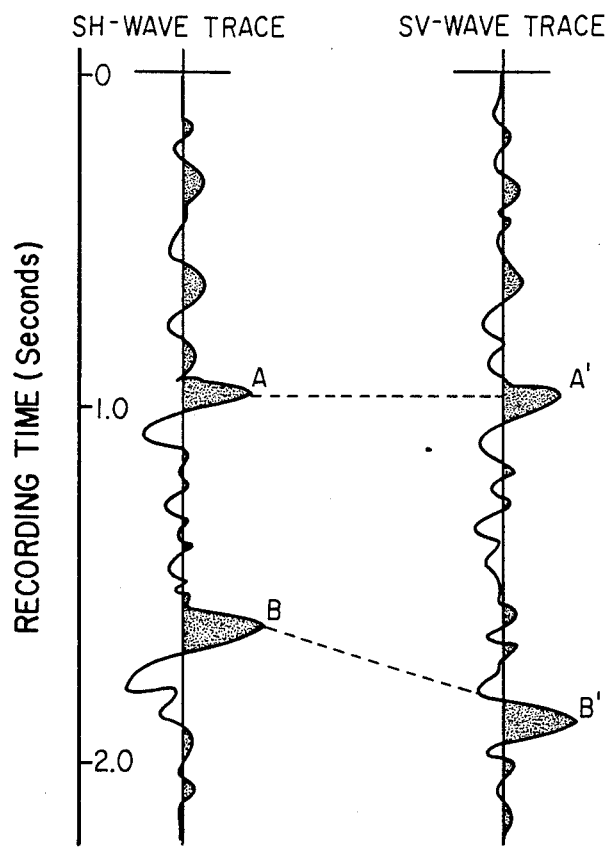
FIG. 4 is a graphical depiction of an SH-wave trace and an SV-wave trace.

It is an object of this invention to provide high resolution determinations of azimuthal anisotropy by estimating the velocity ratio of the SH- to SV-wave from digital, multi-component seismic data on a continuous sample-by-sample basis. Samples of seismic data are typically taken at 1, 2 or 4 millisecond intervals, and represent the reflectivity of subsurface interfaces that are separated by tens to hundreds of feet.

It is a specific object of this invention to provide a method of generating and processing seismic data for subterranean formations by using recorded SH- and SV-reflected energy profiles on a sample-by-sample basis to delineate those subterranean formations having azimuthal anisotropy and, hence, hydrocarbon accumulating capability.

These and other objects will become apparent from the descriptive matter hereinafter, particularly when taken into conjunction with the appended drawings.

In accordance with one embodiment of this invention, there is provided a method of generating and processing seismic data for defining the presence of azimuthally anisotropic subterranean formations comprising the steps of inputting at least first and second energies from a source generating both SH-wave energy and SV-wave energy; recording at least vertical and two mutually orthogonal horizontal components of reflected signals from the respective first and second energies, the signals comprising energy reflected from interfaces of respective strata of the subterranean formations; determining the ratios of the velocities of SV- and SH-energies; and delineating those formations in the subsurface having a value of the ratios different from 1. The ratio, $V_{SH}/V_{SV}$, of the subterranean formation exhibiting azimuthal anisotropy will normally have a magnitude that is less than 1. Conversely, when the ratio is $V_{SV}/V_{SH}$, a magnitude greater than 1 will delineate those formations exhibiting azimuthal anisotropy, ordinarily. It is relatively immaterial which of the ratios are employed so long as the operator realizes which one is being used so that the proper direction can be taken to delineate the reservoir having the azimuthal anisotropy and hence the potential for holding a desired fluid.

DESCRIPTION OF PREFERRED EMBODIMENTS

The method of this invention is carried out as follows. First an inclined impulsive seismic source "capable of putting in energies having both SH-wave energy and SV-wave energy," given a name "ARIS" impulsive seismic source, FIG. 1 is fired in a first direction, for example, as illustrated. As is recognized the term ARIS is a trademark for an impulsive seismic source that is a prior art device in which a weight 13 is fired downward to impinge upon an earth contacting baseplate 15 that imparts the energy to the earth's surface. In the illustrated embodiment, the ARIS impulsive seismic source is shown connected with suitable hydraulic mass retrieval system or the like so that the weight can be again brought to the top firing chamber for firing again, as desired. The ARIS impulsive seismic source is a device that generates SH-wave energy, SV-wave energy and P-wave energy that can be input into the ground. Thereafter, the ARIS impulsive seismic source is then inclined in the other direction, as indicated by dashed line 17, and fired again to input second energy into the subterranean formation. The returned signal must have the vertical and two mutually orthogonal horizontal components recorded. In this way, record 1 (rec. 1, FIG. 2) will show the SH-wave energy in a positive direction (+SH) whereas record 2 (rec. 2) will show the SH-wave energy in a negative direction (−SH). Both will show the P-energy as a positive, or vertical, component.

FIG. 2 illustrates a map-view schematic of an ARIS source baseplate, and the different shear wave energy components (+SH, −SH, +SV, −SV) produced by successive blows to the baseplate when the impacting mass (not shown) is orientated in four different orthogonal directions. Records 1 and 2 are taken as discussed above. The source 11 is oriented in the directions indicated by the arrows labeled +SV and −SV to produce records 3 and 4 (rec. 3 and rec. 4). Whereas the previously mentioned records 1 and 2 will generate positive and negative components of SH-wave energy, respectively, records 3 and 4 will produce positive and negative components of SV-wave energy when the impacting mass is oriented in a vertical plane containing the seismic source and the receiver, indicated by the dashed line. The term "SH-wave" refers to shear wave energy whose particle motion is horizontal and perpendicular to a vertical plane that includes the seismic source and receiver locations. There term "SV-wave" refers to shear wave energy whose particle motion is in any orientation within said vertical plane. Thus the particle motion of SV-wave energy can be horizontal, vertical, or any intermediate direction as long as it is constrained to lie within the vertical plane containing the source and receiver locations.

It is well recognized that in the ARIS impulsive seismic source 11, a large chamber 19 is powered through a means such as a pneumatic source to get the desired compressibility effect by forcing the weight rapidly downward once it has left its holder position 21. The piston 23 affords a means for pushing the weight 13 rapidly downward after the piston-weight assembly has been released by a trigger system that holds the assembly in the firing position.

The baseplate 15 is in reality, more like an anvil in the sense that it absorbs energy and efficiently passes the energy on to the earth and thence to the subterranean formations. It is important to note that the radius of curvature on the weight 13 and the baseplate 15 are the same such that the energy can be readily imparted to baseplate 15 and thence to the subterranean formations.

While the ARIS impulsive source was used in this preferred embodiment, other types of sources may be employed if desired. Vibratory seismic sources may be used in place of the impulsive source. If a vibratory source is used to generate the two shear wave energies, only two recordings are necessary in distinction to the four recordings needed when an impulsive source is used. Impulsive sources produce both shear wave and compressional wave energies, and the four recordings discussed earlier are necessary to remove the compressional wave energy in a manner to be described later so that a pure SH-wave and a pure SV-wave recording can be generated. Vibratory sources can produce pure SH-wave and SV-wave recordings, with little contamination from compressional wave energies, and hence only two recordings are required when a vibratory source is used.

The prior art has shown that the recorded wave traces from different orientations of the ARIS impulsive seismic source representing energy that is reflected back to the surface will have the properties that they can be added or subtracted to obtain compressional (or P-wave) and shear wave components. By subtracting record 2 from record 1, SH-wave components will constructively add together, whereas P-wave components will cancel and become zero to produce a pure SH-wave seismic recording. Likewise, subtracting record 4 from record 3 constructively adds together SV-wave energies and cancels P-wave energies to produce a pure SV-wave recording. The SH-wave and SV-wave recordings are the input data for the invention. The new algorithm that is used to compute the wave velocity characteristics of the SH- and SV-waves make certain assumptions about the earth's properties and the SH-wave and SV-wave seismic traces. These properties are:

(1) The earth is a horizontally stratified medium consisting of sequence of thin, equal travel time homogenous layers.

(2) The SH- and SV-wave traces are bandlimited versions of the primary reflections coefficient sequences. A primary reflection coefficient is the amplitude of the elastic wave energy that is reflected from a subsurface interface separating two media of differing elastic properties. Typical seismic prospecting systems sample these reflected seismic amplitudes every 1, 2 or 4 milliseconds. It is critical to the success of this invention for both traces to have the same source wave form present. The inclined ARIS seismic source satisfies that requirement, since it has been designed to produce both SH- and SV-wave energies. The reflection coefficients for these energies are given by the normal incidence formulae I and II.

$$R_{SHi} = \frac{\rho_i V_{SHi} - \rho_{i+1} V_{SHi+1}}{\rho_i V_{SHi} + \rho_{i+1} V_{SHi+1}} \quad \text{I}$$

$$R_{SVi} = \frac{\rho_i V_{SVi} - \rho_{i+1} V_{SVi+1}}{\rho_i V_{SVi} + \rho_{i+1} V_{SVi+1}} \quad \text{II}$$

where
$R_{SHi}$=normal incidence SH-wave reflection coefficient, n or reflection amplitude, for the i-th interface which corresponds to the i-th SH data sample
$R_{SVi}$=normal incidence SV-wave reflection coefficient, or reflection amplitude, for the i-th interface which corresponds to the i-th SV-data sample
$\rho_i$=density of the i-th layer
$V_{SHi}$=SH-wave interval velocity of the i-th layer
$V_{SVi}$=SV-wave interval velocity of the i-th layer, and
i=0, 1, 2, ..., n where each value of i represents the i-th seismic data sample. A data sample at "i+1" may be taken, for example, at 2 milliseconds after the sample taken at "i".

(3) Certain major reflection events from common subsurface reflection interfaces exist, can be identified and can be correlated between traces on the SH-wave and SV-wave recordings. An example of this correlation is illustrated in FIG. 4 where major reflection events A and B on the SH-wave trace have been determined to correspond to reflection events A' and B', respectively, on the SV-wave trace that was acquired at the same surface location as the SH-wave recording. Note that the smaller reflection events found between reflections A and B on the SH-wave trace and A' and B' on the SV-wave trace cannot be correlated due to their low reflection amplitudes. A gross estimate of VSH/VSV over the entire interval from A to B can be computed as follows:

$$\left(\frac{V_{SH}}{V_{SV}}\right)_{A-B} = \frac{(Dt_{AB}/X)}{(Dt_{A'B'}/X)} = \frac{Dt_{AB}}{Dt_{A'B'}}.$$

where:
$Dt_{AB}$=interval time between reflections A and B on the SH-wave trace
$Dt_{A'B'}$=interval time between reflections A, and B, on the SV-wave trace
X=thickness of the interval between reflection boundaries A and B.

X is typically several hundred to thousands of feet, and so this approach to determine the ratio $(V_{SH}/V_{SV})$ provides only coarse, low, resolution estimates of the anisotropy within the subsurface interval AB.

(4) The amount of seismic energy that is reflected at any given subsurface interface is negligibly small, so that most of the seismic energy is transmitted through the interface. This assumption ensures that the digital recorded data samples on the SH- and SV-wave recordings are scaled versions of the true reflection coefficients in the subsurface.

(5) Spherical divergence, in whatever form it exists, has been adequately compensated in pre-processing.

(6) No attenuation is present.

(7) No interbed or surface multiples are present.

(8) The initial value of $V_{SH}/V_{SV}$ is known at the surface or at any arbitrary starting point.

(9) There is no noise present.

By arranging equations I and II, equations III and IV result:

$$V_{SHi+1} = V_{SHi} \frac{\rho_i}{\rho_{i+1}} \frac{1 - R_{SHi}}{1 + R_{SHi}} \quad \text{III}$$

$$V_{SVi+1} = V_{SVi} \frac{\rho_i}{\rho_{i+1}} \frac{1 - R_{SVi}}{1 + R_{SVi}} \quad \text{IV}$$

Dividing IV into III then give equation V $$\left(\frac{V_{SH}}{V_{SV}}\right)_{i+1} = \left(\frac{V_{SH}}{V_{SV}}\right)_i \frac{(1 - R_{SHi})(1 + R_{SVi})}{(1 + R_{SHi})(1 - R_{SVi})} \quad \text{V}$$

Equation V expresses the value of $V_{SH}/V_{SV}$ for the (i+1)-st layer in terms of this ratio in the i-th layer, and the SH- and SV-normal incidence reflection coefficients at the interface at the top of the (i+1)-st layer. Note that if there are N data samples on each of the SH-wave and SV-wave seismic data traces, then there will be N values of the ratio $V_{SH}/V_{SV}$ computed. This means that a value of the velocity ratio $V_{SH}/V_{SV}$ will be determined for every sample interval (2 milliseconds, for example) which corresponds to a thickness interval of a few tens to hundreds of feet. An important feature to note in this last expression is that no knowledge of or assumptions about the density profile of the subsurface formations are necessary. This last expression can be rewritten in a recursive form since V holds for any value of i. Thus, $$\left(\frac{V_{SH}}{V_{SV}}\right)_{i+1} = \left(\frac{V_{SH}}{V_{SV}}\right)_0 \prod_{j=0}^{i} \frac{(1-R_{SHj})(1+R_{SVj})}{(1+R_{SHj})(1-R_{SVj})} \quad \text{V}$$

where $(V_{SV}/V_{SV})_0$ is the velocity ratio for the first layer.

Equation VI can be written in a more general form $$\left(\frac{V_{SH}}{V_{SV}}\right)_m = \left(\frac{V_{SH}}{V_{SV}}\right)_k \prod_{j=k}^{m-1} \frac{(1-R_{SHj})(1+R_{SVj})}{(1+R_{SHj})(1-R_{SVj})} \quad \text{VII}$$

where $j=k$ represents digital sample number k, $(V_{SH}/V_{SV})_k$ is the shear wave velocity ratio at digital sample k, and $(V_{SH}/V_{SV})_m$ is the shear wave velocity ratio at digital sample m.

Due to the manner in which SH- and SV-wave seismic data is acquired and processed, the resulting digital data values are not numerically equal to reflection coefficients, $R_{SH}$ and $R_{SV}$.

The digital data values must be rescaled so they fall within the normal range of reflection coefficients typically found within the earth. The permissible range for primary reflection coefficients is the interval $+1.0$ to $-1.0$. In practice, it is found that limiting the range of values for the reflection coefficients to a maximum range of $+0.2$ to $-0.2$ more closely approximates the true values found within the earth. Thus the actual values for $R_{SH}$ and $R_{SV}$ that are used in equations (V) or (VI) are not the actual digital data values found on the SH- and SV-wave recordings, but rather rescaled versions denoted $R'_{SH}$ and $R'_{SV}$:

$$R'_{SHi} = e\, R_{SHi}$$

and $$R'_{SVi} = f\, R_{SVi}$$

where e and f are constant scalars that must be determined for the data found in each correlated interval, such as interval A-B shown in FIG. 4.

There are several methods for estimating appropriate values for the constants e and f. The following provides one such method.

With reference to FIG. 4, initial values for e and f are arbitrarily chosen so that the values of the rescaled digital data values on the SH-wave and SV-wave traces, within the intervals A-B, fall between $+0.2$ and $-0.2$. Using these rescaled data samples from the SH-wave and SV-wave traces, let these values correspond to the primary reflection coefficients or $R_{SH}$ and $R_{SV}$ (i=k, k+1, ..., k+m where i=k corresponds to the sample from the reflection A, and i=k+m corresponds to the sample from the lower reflection B.) Using equation VII, the shear wave velocity ratio $(V_{SH}/V_{SV})_i$ within the interval between i=k and i=k+m is computed. The sum of the velocity ratios within this interval times the sampling interval dt (typically a constant equal to 1, 2 or 4 milliseconds) must be equal to the total interval time $Dt_{A,B}$ between reflections A and B on the SV-wave trace, if the constants e and f were properly selected; that is, $$Dt_{A',B'} \stackrel{?}{=} \sum_{i=k}^{k+m} \left(\frac{V_{SH}}{V_{SV}}\right)_i \quad \text{VIII}$$

If this equality (VIII) is strictly true or approximately true within some arbitrarily selected range then the constants e and f have been properly chosen. If the quality is not true, then e and f must be modified, usually in proportion to the error in the equality, equation VIII. The newly modified values of e and f can be used to rescale the data sample values on the SH- and SV-wave traces again, and the whole procedure just described is repeated. Usually several interations are required to converge upon the correct values for the constants e and f.

To maximize the display effectiveness for interpretation, it is proposed that the resulting $(V_{SH}/V_{SV})$ log profile be plotted using a color-coded playout. In this way, the values of $(V_{SH}/V_{SV})$ should oscillate about a nominal value of 1.0 which corresponds to an isotropic solid.

All the foregoing can be done by current computer-automated processes.

The prior art showed, as noted hereinbefore, that recorded waves as shown in FIG. 1, can give pure P information if they are added one to another since SH-energy derived from shots from opposing orientations of the ARIS seismic source have opposite polarities, and hence will sum to zero. On the other hand, if the waves are subtracted, pure SH, or shear wave velocities, information is gathered. This is all recognized in the prior publications.

The advantages of this invention are that the $(V_{SH}/V_{SV})$ log profile will provide a high resolution determination of the presence and magnitude of anisotropic conditions in the subsurface. Typical interval thicknesses that can now be resolved are on the order of a few tens to hundreds of feet. Anisotropy is diagnostic of certain lithologies; for example, shales, and the presence of fractures in reservoirs. With the present invention, accurate images of subsurface anisotropy can be made that can be used to delineate geological features such as fracturing that make possible hydrocarbon accumulation.

Improved accuracy and reliability are provided in detecting anisotropic subsurface intervals, since the $V_{SH}/V_{SV}$ ratio is more accurate that the $V_P/V_{SH}$ or $V_P/V_{SH}$ or $V_P/V_{SV}$ log profiles because it is easier to correlate the reflections events between the SH- and SV-wave sections. The two types of shear waves propagate and are attenuated in the same manner whereas the P-wave propagation differs substantially from the S-wave (shear wave) mode and, hence, is more difficult to relate, or correlate, between data types.

For example, FIG. 3 shows the fracture that afford anisotropy in the sense that the ratio $(V_{SH}/V_{SV})$ will be less than 1.0 for ratios having these characteristics. The vertical profile can be seen in FIG. 3 in which the ray path 29 of the seismic energy will be altered for the SH- and SV-wave energy, although in the same relative direction so as to be easily correlatable, by the fractured strata 31.

As can be appreciated, the ratio, $V_{SH}/V_{SV}$, may be less than 1.0 to delineate those subterranean formations having azimuthal anisotropy or the potential for accumulating hydrocarbon such as oil. For example, if the $V_{SH}/V_{SV}$ equal about 0.7 to 0.8, there is a good potential for accumulating hydrocarbons so the stratum would be of interest to the geologist or geophysicist.

Conversely, the ratio may be inverted and the ratio will be greater than one when it is so inverted.

Although this invention has been described with a certain degree of particularity, it is understood that the present disclosure is made only by way of example and that numerous changes in the details of construction and the combination and arrangement of parts may be resorted to without departing from the spirit of the scope of the invention, reference being had for the latter purpose to the appended claims.

What is claimed is:

1. A method of generating and processing seismic data for defining the presence of azimuthally and isotropic subterranean reservoirs comprising the steps of:
   a. using a seismic source to generate two mutually orthoginal shear wave energies in the earth;
   b. recording signals resulting from reflections of said shear wave energies from interfaces of said subterranean formations;
   c. determining factors indicating the ratios of the velocities $V_{SH}$ and $V_{SV}$, using all corresponding time samples from said recorded signals employing amplitude information of all said signals over a predetermined depth interval of interest in accordance with $V_{sh}/V_{sv} = (V_{sh}/V_{sh})$ surface $(1-R_{shj})(1+R_{svj})/((1+R_{shj})(1-R_{svj}))$; and
   d. delineating those subterranean formations having a value of said ratios less than 1 and a magnitude thereof as an indication of the azimuthal anisotropy and, hence, the potential for holding a desired fluid.

2. The method of claim 1 wherein said inputting is done by firing an inclined seismic source capable of putting energy adequate to produce both SH- and SV-energies into said earth subterranean formations with the inclinations being first one direction and then the other direction to provide traces on a record that can be added, subtracted and divided to obtain the desired values and ratios of $V_{SH}$, $V_{SV}$, and $(V_{SH}/V_{SV})$.

* * * * *